(12) United States Patent
Liebelt

(10) Patent No.: US 11,608,849 B2
(45) Date of Patent: Mar. 21, 2023

(54) GROMMET REMOVAL ASSEMBLIES AND METHODS

(71) Applicant: ILLINOIS TOOL WORKS INC., Glenview, IL (US)

(72) Inventor: Scott Liebelt, Eau Claire, WI (US)

(73) Assignee: Illinois Tool Works Inc., Glenview, IL (US)

( * ) Notice: Subject to any disclaimer, the term of this patent is extended or adjusted under 35 U.S.C. 154(b) by 207 days.

(21) Appl. No.: 16/722,730

(22) Filed: Dec. 20, 2019

(65) Prior Publication Data

US 2020/0217345 A1    Jul. 9, 2020

Related U.S. Application Data

(60) Provisional application No. 62/788,235, filed on Jan. 4, 2019.

(51) Int. Cl.
*F16B 21/08* (2006.01)
*F16B 21/07* (2006.01)

(52) U.S. Cl.
CPC ........... *F16B 21/082* (2013.01); *F16B 21/075* (2013.01)

(58) Field of Classification Search
CPC ...... F16B 21/086; F16B 21/075; B25B 31/00; B25B 31/005
USPC ....................................................... 411/508
See application file for complete search history.

(56) References Cited

U.S. PATENT DOCUMENTS

| | | |
|---|---|---|
| 3,164,054 A | 1/1965 | Biesecker |
| D273,091 S | 3/1984 | Kurosaki |
| 4,487,998 A | 12/1984 | Pegram |
| 4,675,937 A | 6/1987 | Mitomi |
| 4,927,287 A | 5/1990 | Ohkawa et al. |
| 4,952,106 A | 8/1990 | Kubogochi et al. |
| 4,953,269 A * | 9/1990 | Ragsdale ................ B25B 31/00 24/625 |
| 5,294,225 A | 3/1994 | Kazino et al. |
| 5,375,954 A | 12/1994 | Eguchi |
| 5,435,679 A | 7/1995 | Barry |
| 5,499,737 A | 3/1996 | Kraus |
| 5,507,610 A | 4/1996 | Benedetti et al. |

(Continued)

FOREIGN PATENT DOCUMENTS

| | | |
|---|---|---|
| CN | 106351930 A | 1/2017 |
| CN | 106574649 A | 4/2017 |

(Continued)

OTHER PUBLICATIONS

European Search Report from Application No. 20150033.7, dated May 12, 2020. (8 pages).

*Primary Examiner* — Flemming Saether
(74) *Attorney, Agent, or Firm* — Quarles & Brady LLP

(57) ABSTRACT

A grommet removal assembly includes a grommet and a grommet removal tool. The grommet includes a body defining a longitudinal axis, a plurality of arms extending from the body, the plurality of arms defining first engagement ramps, and a plurality of legs extending from the body. The grommet removal tool includes a shaft and a plurality of wings extending from the shaft and defining a plurality of second engagement ramps. The first engagement ramps of the wings are capable of engagement with the second engagement ramps along the plurality of arms to draw the arms inward, toward the longitudinal axis of the body.

18 Claims, 11 Drawing Sheets

(56) References Cited

U.S. PATENT DOCUMENTS

| | | |
|---|---|---|
| 5,632,581 A | 5/1997 | Hasada |
| 5,795,118 A | 8/1998 | Osada et al. |
| 5,850,676 A | 12/1998 | Takahashi et al. |
| 5,975,820 A | 11/1999 | Kirchen |
| 5,980,180 A | 11/1999 | Schiess |
| 6,364,586 B1 | 4/2002 | Okada |
| 6,431,585 B1 | 8/2002 | Rickabus et al. |
| 6,507,976 B2 | 1/2003 | Ichimaru |
| 6,616,479 B1 * | 9/2003 | Jones ............... F16B 19/1081 411/48 |
| 6,769,849 B2 * | 8/2004 | Yoneoka ........... F16B 19/1081 411/41 |
| 7,033,121 B2 | 4/2006 | Kirchen |
| 7,105,750 B1 | 9/2006 | Duhr |
| 7,114,217 B2 | 10/2006 | Matsuzawa et al. |
| 7,207,759 B2 | 4/2007 | Kato |
| 7,690,876 B2 | 4/2010 | Kawai et al. |
| 8,037,582 B2 * | 10/2011 | Okada ............... F16B 19/1081 24/297 |
| D665,245 S | 8/2012 | Nakazato |
| 8,245,367 B2 * | 8/2012 | Kato ..................... F16B 45/00 24/458 |
| 8,348,568 B2 | 1/2013 | Murakami |
| 8,572,805 B2 | 11/2013 | Inoue |
| 8,662,807 B2 | 3/2014 | Adachi |
| 8,769,779 B2 | 7/2014 | Lee |
| 8,961,092 B2 * | 2/2015 | De Jong ............ B60R 21/213 411/508 |
| 9,061,379 B1 | 6/2015 | Mead et al. |
| 9,115,743 B2 * | 8/2015 | Yamamoto ........ F16B 21/065 |
| 9,303,672 B2 | 4/2016 | Lepper |
| 9,879,707 B2 | 1/2018 | Watanabe |
| D824,747 S | 8/2018 | Briese et al. |
| 10,113,577 B2 | 10/2018 | Kanie |
| 10,396,489 B2 | 8/2019 | Mizuno et al. |
| 10,451,100 B2 * | 10/2019 | Flynn .................... F16B 21/07 |
| 10,900,513 B2 | 1/2021 | Diep et al. |
| 2002/0026693 A1 | 3/2002 | Akema et al. |
| 2002/0094253 A1 | 7/2002 | Enomoto et al. |
| 2004/0013481 A1 | 1/2004 | Jeppesen |
| 2004/0020016 A1 | 2/2004 | Yoneoka |
| 2006/0171793 A1 | 8/2006 | Kawai et al. |
| 2007/0289770 A1 * | 12/2007 | Koike .................. F16B 5/0621 174/153 G |
| 2008/0298925 A1 | 12/2008 | Shinozaki |
| 2010/0162534 A1 | 7/2010 | Kato |
| 2011/0014005 A1 | 1/2011 | Shinozaki |
| 2012/0057948 A1 | 3/2012 | Jeon |
| 2012/0210546 A1 | 8/2012 | Jang et al. |
| 2012/0230796 A1 | 9/2012 | McClure |
| 2014/0047679 A1 | 2/2014 | Lepper et al. |
| 2014/0099156 A1 | 4/2014 | Weber |
| 2016/0348707 A1 | 12/2016 | Wu |
| 2020/0141440 A1 | 5/2020 | Liebelt et al. |
| 2020/0217345 A1 | 7/2020 | Liebelt |

FOREIGN PATENT DOCUMENTS

| | | |
|---|---|---|
| CN | 108767538 A | 11/2018 |
| DE | 3931180 A1 | 4/1990 |
| EP | 2719907 A1 | 4/2014 |
| EP | 2722534 A1 | 4/2014 |
| WO | 2009030334 A3 | 6/2009 |

* cited by examiner

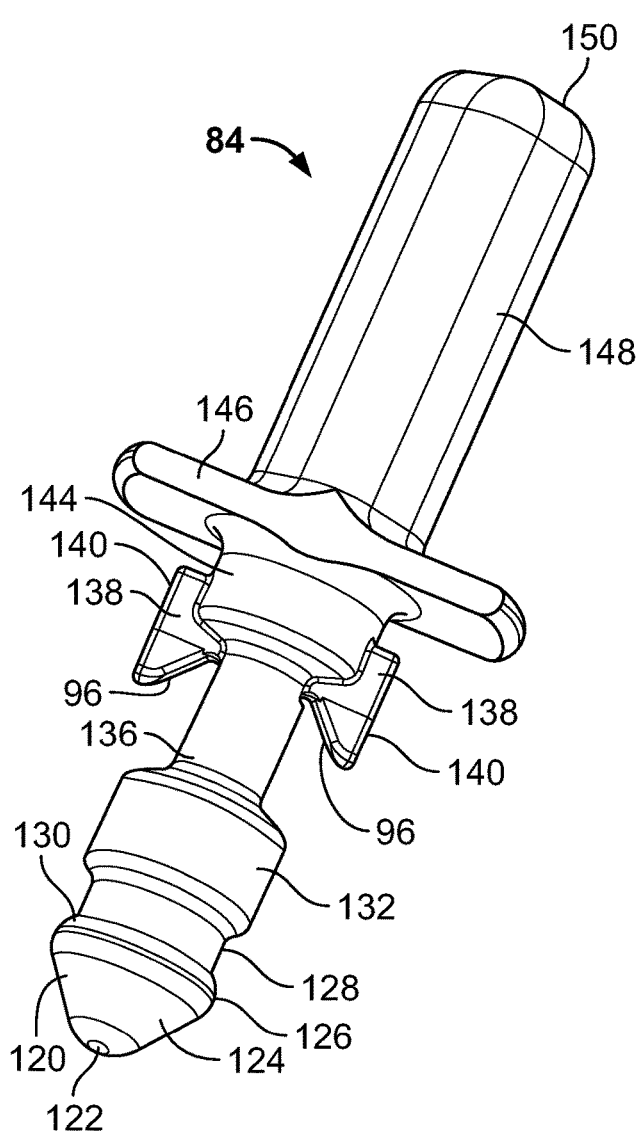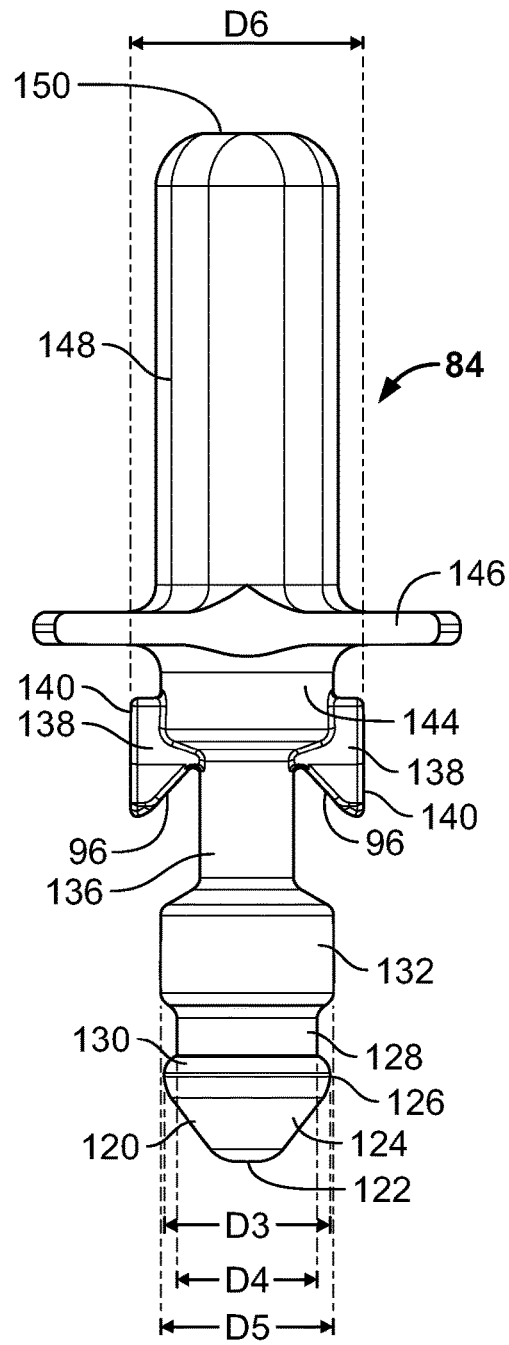
FIG. 9
FIG. 10

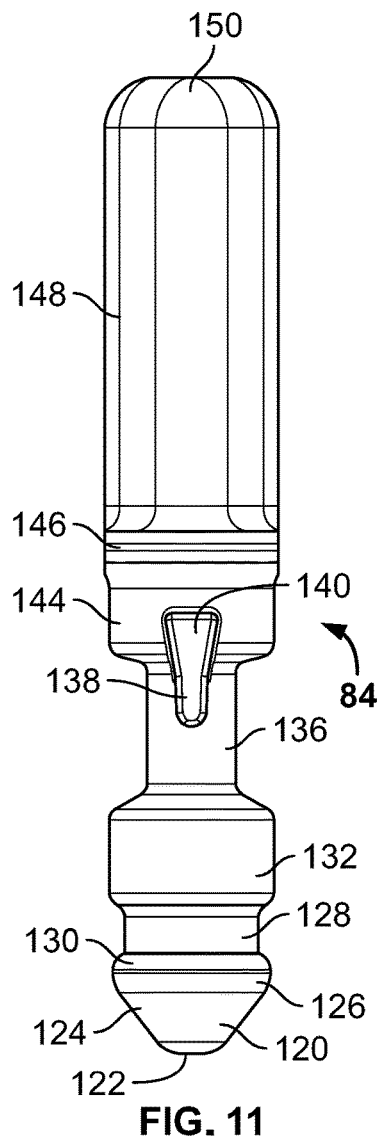
FIG. 11
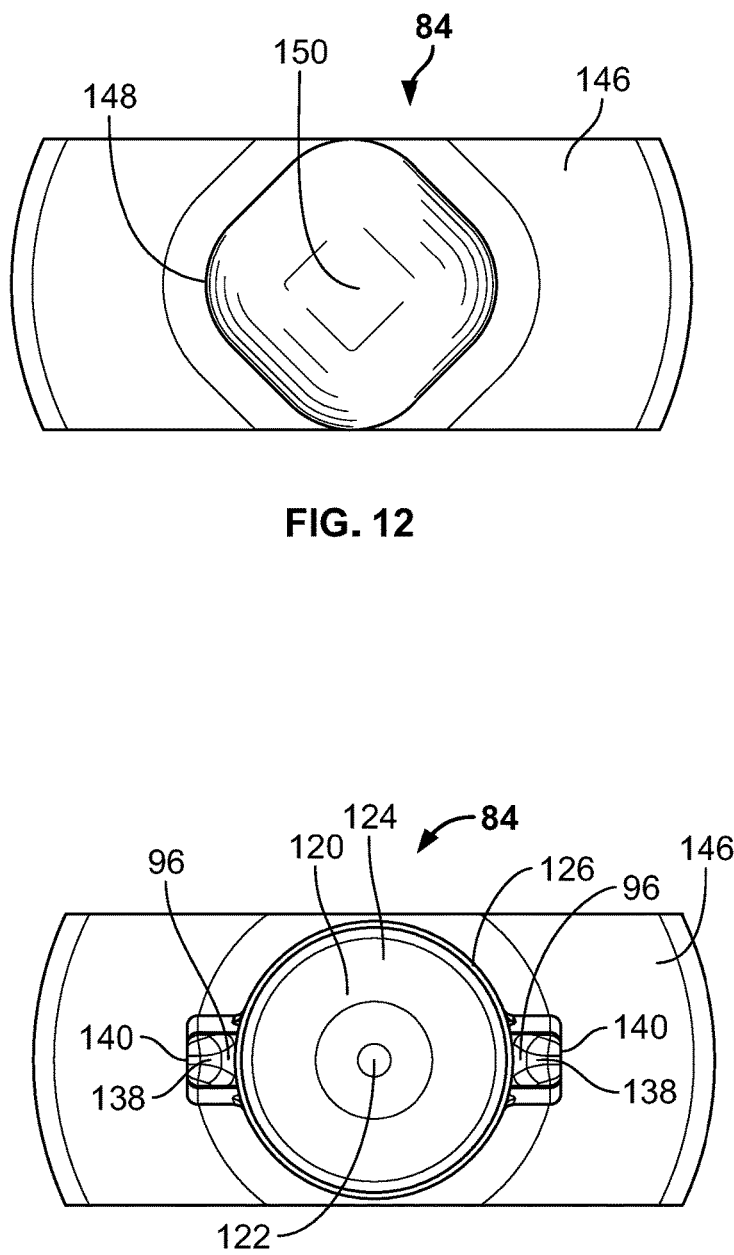
FIG. 12
FIG. 13

GROMMET REMOVAL ASSEMBLIES AND METHODS

CROSS REFERENCE TO RELATED APPLICATIONS

The present application claims the benefit of U.S. Patent Application Ser. No. 62/788,235, filed on Jan. 4, 2019, which is incorporated by reference herein in its entirety.

FIELD OF EMBODIMENTS OF THE DISCLOSURE

The present disclosure relates to fastener removal assemblies including fasteners and fastener removal devices, and more specifically to grommet removal assemblies including grommets and grommet removal tools.

BACKGROUND

Fasteners may be used to secure components together. Grommets are a type of fastener that typically comprise a ring or edge strip, are generally flared or collared on each side to keep the grommet in place, and are often made of metal, plastic, or rubber. In some instances, grommets may be used to prevent tearing or abrasion of pierced material, to cover sharp edges of the piercing, to protect the insulation of wire, cable, or lines being routed therethrough, or for securing components together.

In the automotive context, grommet fasteners may be used to securely connect a first panel to a second panel by adhesively securing the grommet to the first panel and by snapably securing the grommet through a hole formed in the second panel. Such grommets may include a passage that allows a pin to pass therethrough during a mating process. The grommet passage typically conforms to the shape of a shaft of the pin when the pin is secured with respect to the grommet. One known fastener includes a grommet having four legs that spread apart when a pin or other type of tool is driven within the grommet passage. The pin and/or the grommet may be configured to be reused.

In some instances, the grommet may include arms depending from a body portion that are retractable and extend outward after the grommet is placed into use. The arms may extend outward after the grommet is inserted through an opening of material, and may remain in such a configuration until the arms are manually depressed inward, thereby allowing the grommet to be removed from the opening. However, after the compressive, squeezing force is released, the arms may spread back open. As such, when an individual attempts to remove the grommet, the spread arms may abut or snag into an edge of a retaining hole or channel of the component, thereby hindering or even preventing removal of the grommet.

Current grommet designs allow for installation utilizing minimal linearly applied force with high retention since the arms extending outward from the grommet lock into place after the grommet has been installed, but do not allow for a way to remove the grommet from its place of retention via the grommet's primary or "A-side." In many circumstances, the grommet must be destroyed or accessed from the rear to compress the arms to initiate removal of the grommet. In light of the above, improved grommet removal assemblies and methods are needed.

SUMMARY

Embodiments of the present disclosure generally relate to a grommet that includes a body defining a longitudinal axis and that has a wall, the wall defining an inner surface. The grommet further includes a collar extending from the body and away from the longitudinal axis, and a plurality of legs extending from the body. The grommet also includes a plurality of arms extending from the body at a flexure joint, each of the plurality of arms including an inner surface that is flush with the inner surface of the wall in a first state, an angled surface, and a first engagement ramp. The arms are movable between the first state and a second state at the flexure joint.

In some embodiments, the angled surfaces of the plurality of arms are flush with an outer surface of the wall in the second state. In some embodiments, the first engagement ramps interrupt the angled surfaces of the arms, and the first engagement ramps are configured to receive second engagement ramps along a grommet removal tool. In some embodiments, the plurality of arms are surrounded by at least one opening between each of the plurality of arms and the body. In some embodiments, longitudinal slots separate the plurality of legs that extend from the body. In some embodiments, the plurality of legs comprise inwardly canted tips that are angled toward the longitudinal axis. In some embodiments, the plurality of arms are surrounded by windows, and first and second segments of the windows are disposed along first and second sides of the plurality of arms. In some embodiments, the plurality of arms includes only two arms, which are disposed on opposite sides of the grommet.

In some embodiments, a grommet removal tool includes a head defining a head surface, a base, and a tip. Further, the grommet removal tool includes a neck extending from the base of the head at a shoulder, a collar that joins the neck with a shaft, and a plurality of wings extending from the shaft, the plurality of wings defining first engagement ramps. A diameter of the base of the head is greater than a diameter of the neck, and a diameter of the collar is greater than a diameter of the neck.

In some embodiments, the first engagement ramps of the plurality of wings are configured to engage with second engagement ramps along arms of a grommet. In some embodiments, the plurality of wings are disposed intermediate a lateral stop and the head of the grommet removal tool. In some embodiments, the plurality of wings comprises only two wings, and the two wings are mirror images of one another.

In some embodiments, a grommet removal assembly includes a grommet and a grommet removal tool. The grommet includes a body defining a longitudinal axis, a plurality of arms extending from the body, the plurality of arms defining first engagement ramps, and a plurality of legs extending from the body. The grommet removal tool includes a shaft and a plurality of wings extending from the shaft and defining a plurality of second engagement ramps. The second engagement ramps of the wings are capable of engagement with the first engagement ramps along the plurality of arms to draw the arms inward, toward the longitudinal axis of the body.

In some embodiments, an inner surface of the plurality of arms is flush with an inner surface of the body in a first state, and the inner surface of the plurality of arms is not flush with the inner surface of the body in a second state. In some embodiments, the grommet removal tool includes a head, the grommet includes a plurality of legs, and the head of the grommet removal tool is inserted through an opening defined by the plurality of legs when the second engagement ramps of the wings engage with the first engagement ramps along the arms. In some embodiments, tips of the plurality of legs are inwardly canted toward the longitudinal axis.

In some embodiments, windows surround lateral sides of the plurality of arms that extend from the body. In some embodiments, the plurality of arms further define angled surfaces, and the angled surfaces are angled with respect to the first engagement ramps. In some embodiments, the angled surfaces are flush with an outer surface of the body when the arms have been drawn in by the ramps of the wings. In some embodiments, inner surfaces of the arms are flush with an inner surface of the body before the arms are drawn in by the ramps of the wings.

DESCRIPTION OF THE DRAWINGS

FIG. 9 is a top perspective view of a grommet removal tool in accordance with the present disclosure;

FIG. 10 is a front elevational view of the tool of FIG. 9;

FIG. 11 is a side elevational view of the tool of FIG. 9;

FIG. 12 is a top plan view of the tool of FIG. 9;

FIG. 13 is a bottom plan view of the tool of FIG. 9;

DETAILED DESCRIPTION

Figure 1:
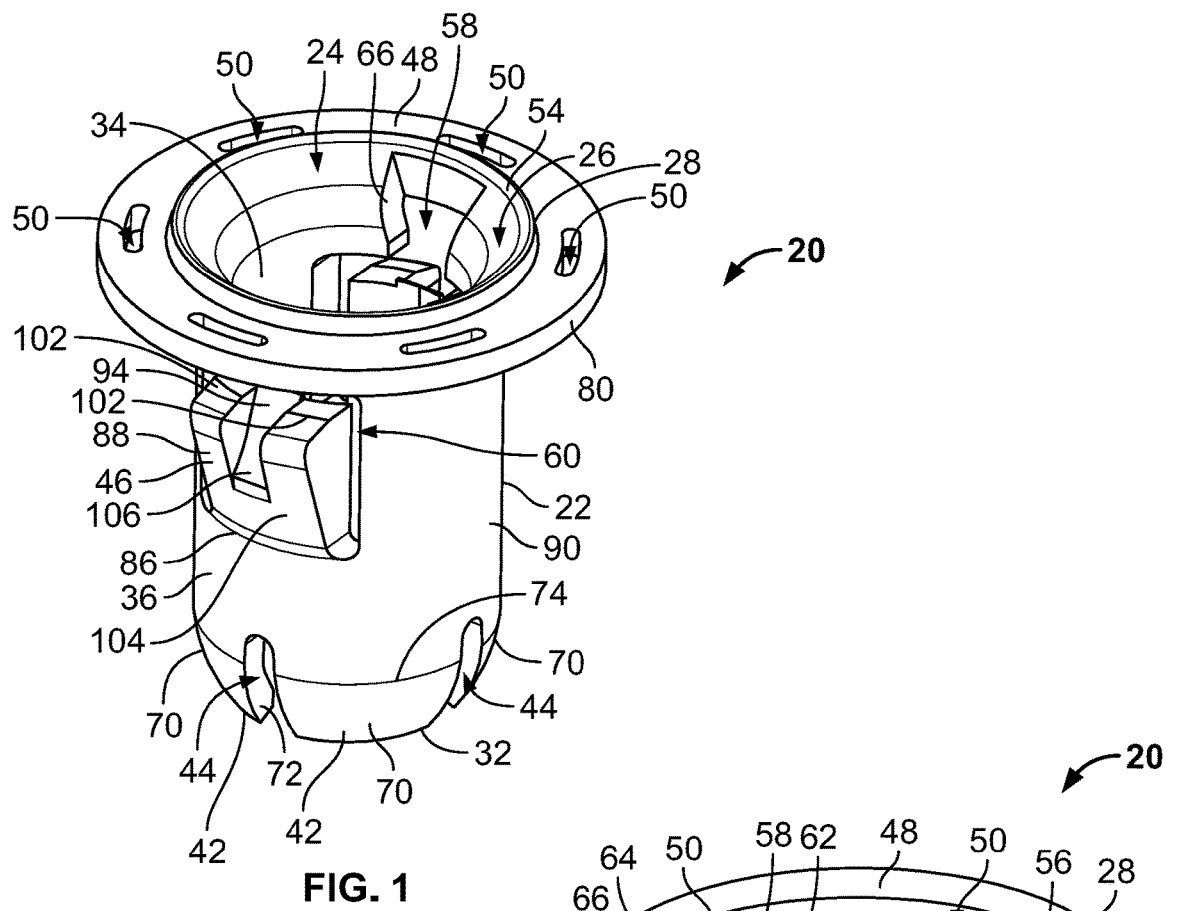
FIG. 1 is a top perspective view of a grommet, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

Embodiments of the present disclosure provide for a grommet and a specialized removal tool for simplified removal of the grommet. Specifically, wings or ramps disposed along the tool align with windows within a head of the grommet, and when the tool is inserted into the grommet, the tool compresses the arms, i.e., box prongs, which extend from a body of the grommet, and retains the grommet in a retracted state while the grommet is removed. The features described herein allow for the arms along sides of the grommet to be compressed with the use of the tool, which may be inserted from a primary or A-side, allowing the grommet to be removed from the material to which the grommet is coupled, which in some contexts may be sheet metal, without damage to the grommet or the material surface.

Figure 2:
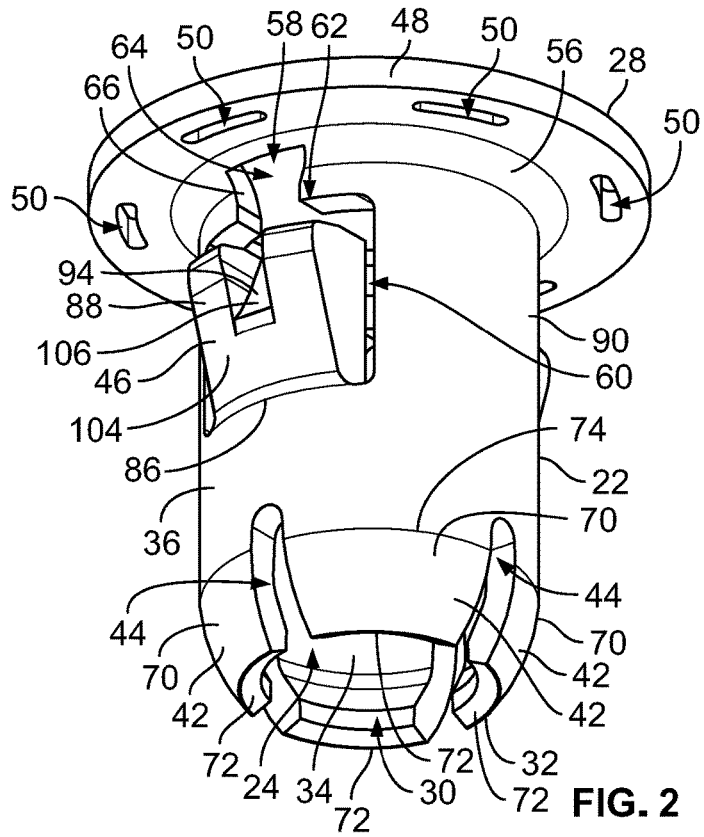
FIG. 2 is a bottom perspective bottom view of the grommet of FIG. 1.
Figure 3:
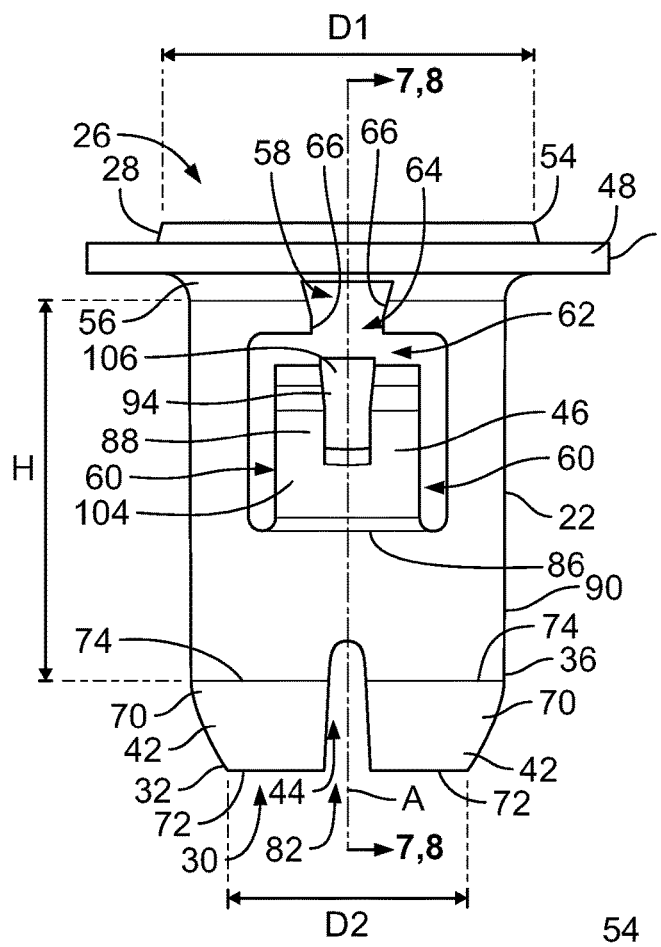
FIG. 3 is a side elevational view of the grommet of FIG. 1.

FIGS. 1-8 illustrate a fastener or grommet 20 in accordance with the present disclosure. Referring to FIGS. 1 and 2, top and bottom perspective views of the grommet 20 are shown, respectively. FIG. 1 illustrates a top perspective view of the grommet 20 that includes a body 22, the body 22 being generally cylindrical. The grommet 20 may be integrally molded and formed as a single piece of material, such as injection-molded plastic. The grommet 20 includes a passageway 24 defined by a first or upper opening 26 at a first or upper end 28 and a second or lower opening 30 at a second or bottom end 32. The passageway 24 is partially defined by an inner surface 34 of a wall 36 that is generally cylindrical or may be slightly tapered, the wall 36 extending between the upper opening 26 and the lower opening 30, with several interrupted portions, as outlined in greater detail below. Referring to FIG. 3, the upper opening 26 has a diameter D1 that is larger than a diameter D2 of the lower opening 30. Further, a longitudinal axis A extends through a center of the passageway 24.

Referring again to FIGS. 1 and 2, a plurality of feet 42 extend from the body 22 adjacent the lower opening 30. The feet 42 are separated by a plurality of longitudinal slots 44 which generally define the feet 42. Still further, arms 46 extend outward from the body 22. A collar 48 is disposed peripherally about the upper end 28 of the body 22, and extends radially outward therefrom. A plurality of elongate apertures 50 are provided within the collar 48, which may provide for attachment of the grommet 20 to an object, such as a steel panel (not shown). The plurality of elongate apertures 50 may be provided in a number of different configurations, and any number of elongate apertures 50 may be included. Alternatively, the grommet 20 may not include the apertures 50 along the collar 48. A flange 54 extends outwardly from an intersection of the collar 48 and the body 22, in a direction that is substantially parallel with respect to the longitudinal axis A.

Referring specifically to FIG. 2, the body 22 of the grommet 20 is shown more clearly, and a fillet 56 that forms a connection between the collar 48 and the body 22 is illustrated. The fillet 56 extends radially about the longitudinal axis A, and is interrupted at diametrically opposed front and rear sides by windows 58 that define openings within the body 22 of the grommet 20. While the present embodiment includes two of the windows 58, the same reference numbers apply to like elements of each of the windows 58 as described hereinafter below. As such, only a single window 58 is described and referred to herein, however, the windows 58 are identical, and the description of one relates to the description of the other.

Still referring to FIG. 2, the window 58 extends from the collar 48 toward the bottom end 32 of the body 22, the window 58 being in the shape of a tuning fork. Referring to FIG. 3, the window 58 comprises first and second lateral segments 60 that are generally longitudinal and parallel with respect to one another, a central segment 62 that joins and is orthogonal with respect to the lateral segments 60, and a top portion 64 that is defined by outwardly extending intermediate sides 66 of the body 22 that flare outward from the central segment 62 toward the fillet 56. The lateral segments 60 and the central segment 62 generally define a profile within which the arms 46 are disposed. The arms 46 on opposing sides of the body 22 are also identical, and only one of the arms 46 will be described hereinafter for ease of description.

As illustrated in FIG. 2, the grommet 20 may include four of the legs 42 that extend from the body 22. Alternatively, the grommet 20 may include more or fewer legs 42 than shown. The slots 44 are formed between the legs 42. Each of the legs 42 may include an extension beam 70 and an inwardly-canted tip 72 extending from the extension beam 70. In operation, the securing legs 42 are configured to outwardly pivot about flexure joints 74 that connect the legs 42 with the body 22 as a tool or other object is moved into the central passageway 24. The slots 44 may extend along varying heights of the grommet 20 and need not be limited to the sizes illustrated in the figures. In some embodiments, a height H (see FIG. 3) of the body 22 is reduced and the slots 44 maintain the same length, thus, the slots 44 extend along a greater proportion of the grommet 20. The securing legs 42 are capable of pivoting outwardly at the flexure joints 74 to expand in order to secure the grommet 20 into an opening of a component, such as a panel. The flexure joints 74 of the legs also allow the grommet removal tool to be inserted through the lower opening 30 to retain the grommet 20 during removal thereof, as described in greater detail hereinafter below.

Figure 4:
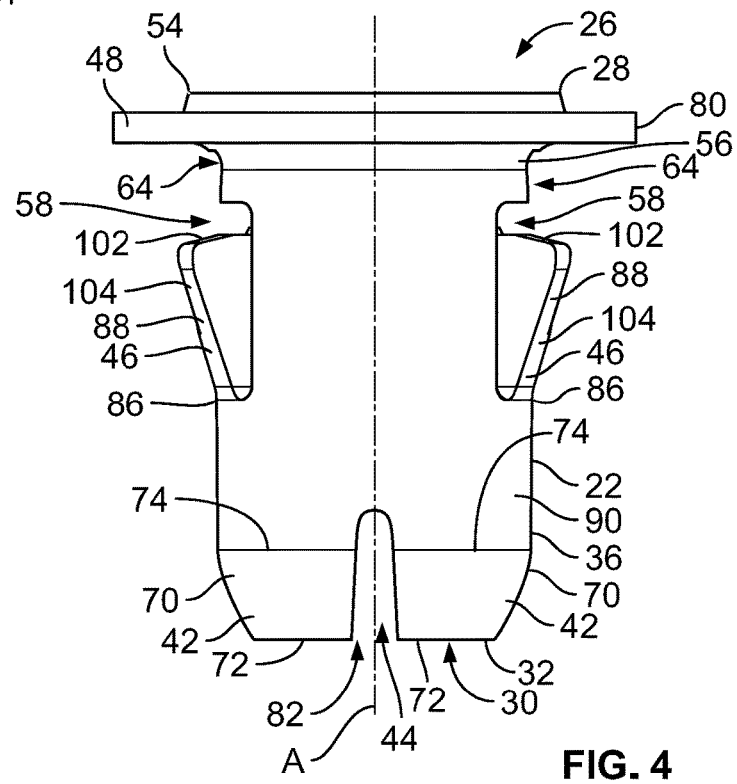
FIG. 4 is a front elevational view of the grommet of FIG. 1.

Referring specifically to FIGS. 3 and 4, side and front elevational views of the grommet 20 are shown. Referring specifically to FIG. 3, a side of the grommet 20 is shown in greater detail. Specifically referring to the upper end 28 of the grommet 20, the flange 54 is shown in elevation, the flange 54 having a generally frusto-conical outer profile, extending slightly inward, toward the longitudinal axis A. The collar 48 is also shown in elevation, the collar 48 being generally cylindrical in nature and having a peripheral side 80 that extends in a direction collinear with respect to the longitudinal axis A. The fillet 56 at the connection between the collar 48 and the body 22 is also shown more clearly, the fillet 56 being generally rounded. The fillet 56 is interrupted on opposing sides by the top portions 64 of the windows 58. The body 22 extends downward from the fillet 56 and is interrupted by the segments 60 of the window 58. The arm 46 extends upward from where it intersects the body 22. One of the slots 44 that define the legs 42 is also shown, the slot 44 having a mouth 82 adjacent the bottom end 32 that is wider than a portion of the slot 44 that extends into the body 22.

Referring to FIG. 4, a front of the grommet 20 is shown in greater detail. The flange 54, the collar 48, and the illustrated slot 44 are disposed in generally the same orientation as the same elements depicted in FIG. 3. When viewed from the front, the fillet 56 is generally interrupted by the windows 58, and the arm 46 extend outward from the body 22. As described in greater detail hereinafter below, the arms 46 are flexible and are formed to retract into the passageway 24 of the grommet 20 when drawn therein through the use of a grommet removal tool 84 (see FIG. 9). An intersection or joint 86 between the arms 46 and the body 22 is generally flexible, and allows the arms 46 to retract inward, once a force is applied, to a retracted position where an outer surface 88 of the arms 46 is generally flush with an outer surface 90 of the body 22.

Figure 5:
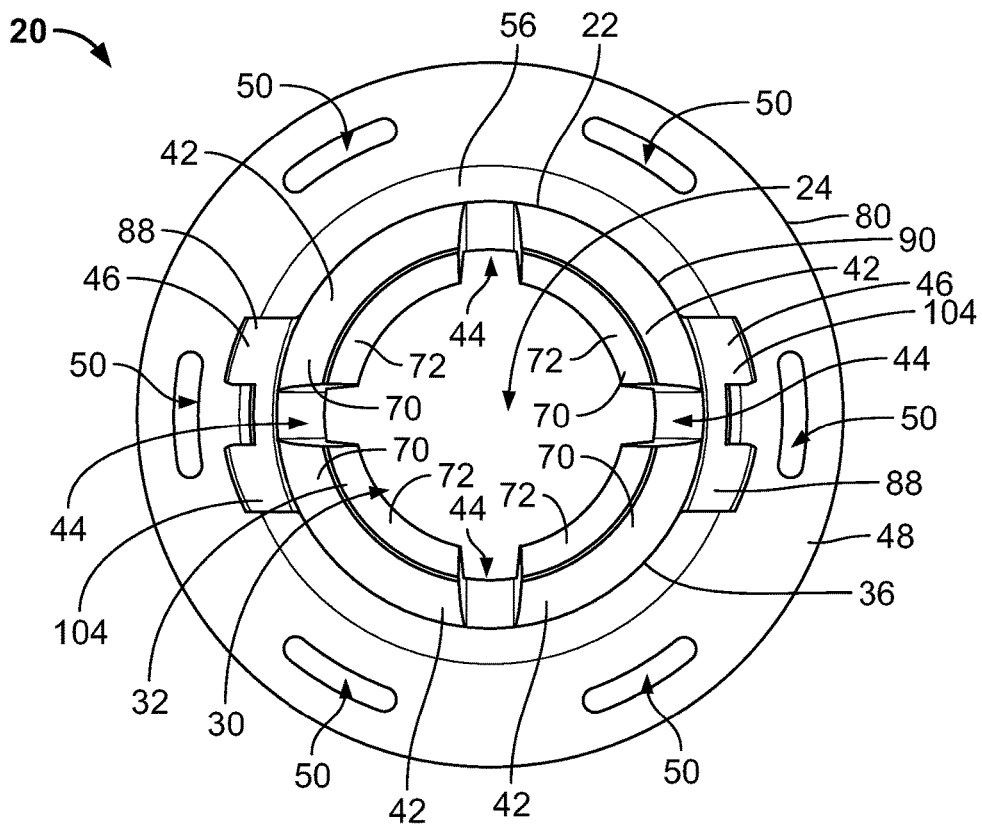
FIG. 5 is a top plan view of the grommet of FIG. 1.
Figure 6:
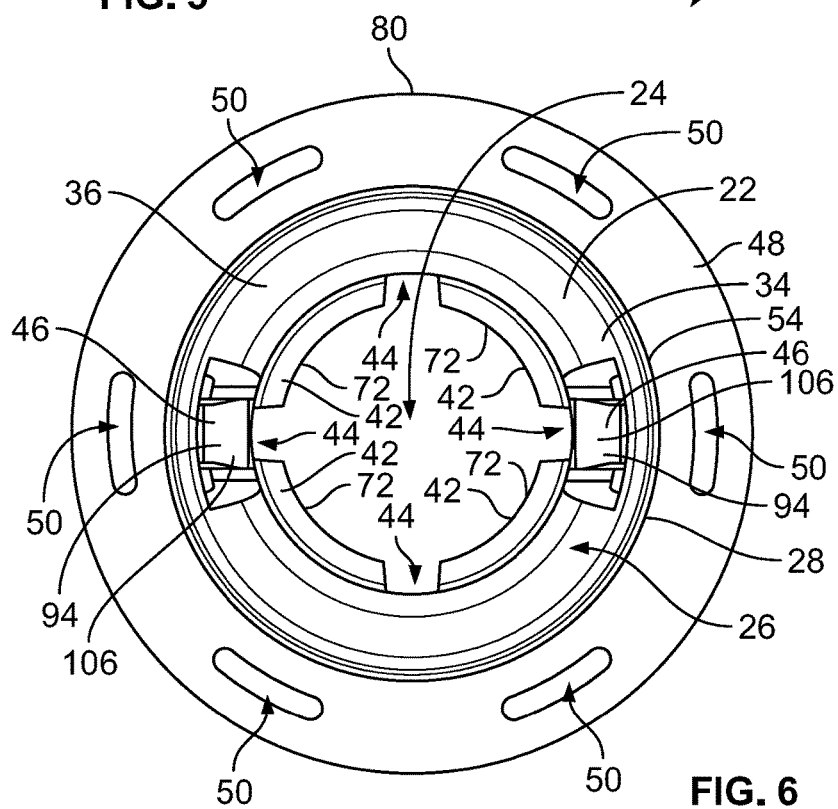
FIG. 6 is a bottom plan view of the grommet of FIG. 1.

Referring to FIGS. 5 and 6, top and bottom plan views of the grommet 20 are illustrated. Referring specifically to FIG. 6, first engagement ramps 94 that are disposed along the arms 46 are shown more clearly, the first engagement ramps 94 being formed to receive portions of the grommet removal tool 84, as noted above and described in greater detail below. The first engagement ramps 94 extend outwardly from terminal ends of the arms 46 and allow second engagement ramps 96 disposed along the tool 84 (see FIG. 9) to slide up the first engagement ramps 94, and draw the arms 46 inward, toward the longitudinal axis A. The first engagement ramps 94 generally interrupt medial portions of the arms 46.

The first engagement ramps 94 may define an angle of between about 15 degrees and about 35 degrees with respect to the longitudinal axis A. In some embodiments, the first engagement ramps 94 may define an angle with respect to the longitudinal axis A of between about 5 degrees and about 60 degrees, or between about 10 degrees and about 50 degrees, or about 25 degrees. The angle of the engagement ramps 94 may be the same as an angle of the second engagement ramps 96 disposed on the grommet removal tool 84. To that end, the first and second engagement ramps 94, 96 may define complementary angles, and may further include additional complementary or lock-and-key features.

For example, in some embodiments, the engagement ramps 94, 96 may include additional features, such a concave surface, a convex surface, one or more protrusions, one or more slits, or another type of non-planar feature that can aid in providing a lock-and-key feature to the engagement ramps 94, 96. As such, the engagement ramps 94, 96 may define varying complementary features that allow the ramp combination to achieve the intended function. Still further, in some embodiments, the first ramps 94 comprise a vertical wall with a slight lead-in that allows the ramps 96 along the removal tool 84 to draw the arms 46 inward, toward the longitudinal axis A.

Figure 7:
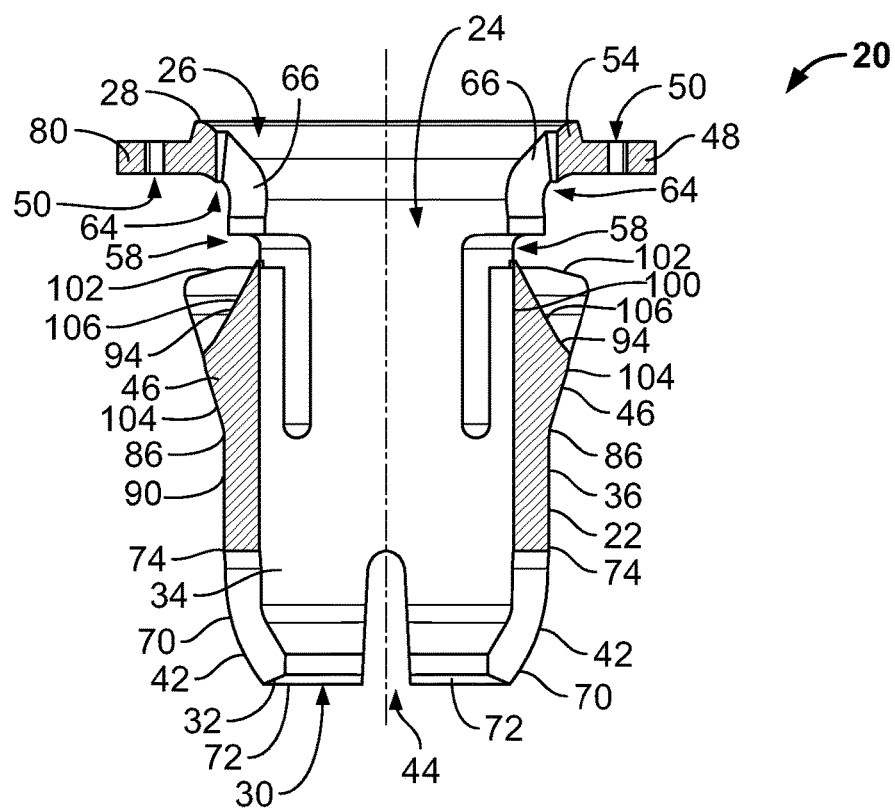
FIG. 7 is a elevational cross-sectional view taken through line 7-7 of FIG. 3.
Figure 8:
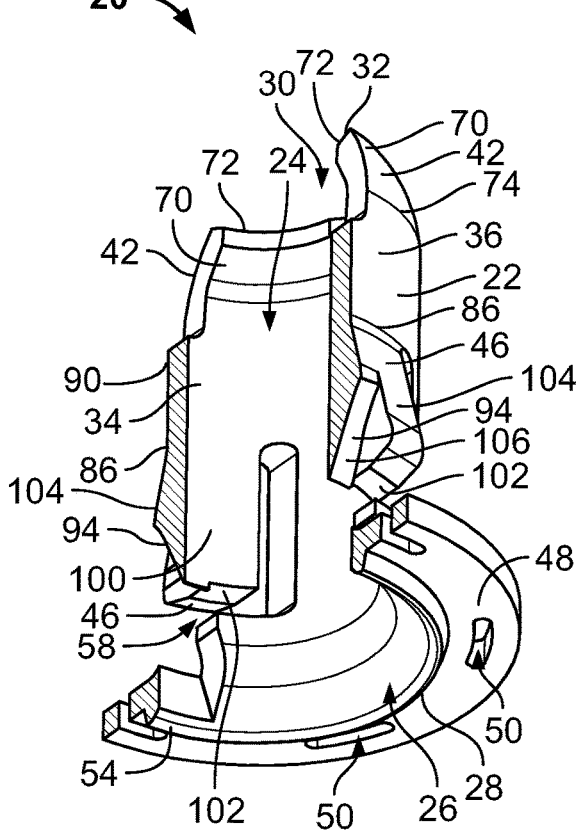
FIG. 8 is a perspective, cross-sectional view taken through line 8-8 of FIG. 3.

Referring to FIGS. 7 and 8, components of the grommet 20 are shown more clearly in elevational and perspective cross-sectional views, respectively. Specifically, the arms 46 are shown extending outward from the joints 86, away from the longitudinal axis A. The grommet 20 of FIG. 7 is shown in a non-retracted, first state. Each of the arms 46 includes an inner surface 100 that is generally flush with the inner surface 34 of the wall 36 in the first state. Each of the arms 46 further includes lower surfaces 102, which extend outwardly from the inner surface 100 and join an angled surface 104, which intersects with the outer surface 90 of the body 22 at the joint 86. The angled surfaces 104 of the arms 46 are offset with respect to the outer surface 90 of the body 22 in the first state, and are generally flush and coincident with the outer surface 90 of the body 22 in a second, or retracted state (see FIG. 18). In the first state, the angled surfaces 104 of the arms 46 are disposed at an angle of greater than about 30 degrees but less than about 170 degrees with respect to the outer surface 90 of the body 22.

As noted above, the angled surfaces 104 extend from the outer surface 90 of the body 22 to the lower surfaces 102 of the arms 46. The angled surfaces 104 and the lower surfaces 102 of the arms 46 are interrupted by the ramps 94, which define ramp surfaces 106 that extend inward from an intersection with the angled surfaces 104 to a point adjacent the inner surface 100 of the arms 46. The angled surfaces 104 and the ramp surfaces 106 define angles between the two surfaces of between about 70 degree and about 160 degrees, or between about 90 degrees and about 140 degrees, or about 130 degrees.

Now referring to FIGS. 9-13, the grommet removal tool 84 is shown in detail. Specifically referring to FIG. 9, a perspective view of the tool 84 is shown. The tool 84 may be integrally molded and formed as a single piece of material, such as injection-molded plastic. The tool 84 includes a head 120 in the shape of a rounded cone, and defining a tip 122. A head surface 124 extends from the tip 122 toward a base 126 of the head 120, the base 126 of the head defining a greatest diameter of the head 120. A neck 128 of the tool 84 joins the head 120 at a shoulder 130. The neck 128 is generally cylindrical and extends from the head 120 toward a collar 132. Referring to FIG. 10, the base 126 of the head 120 has a head diameter D3, the neck 128 has a neck diameter D4, and the collar 132 has a collar diameter D5. The head diameter D3 is slightly smaller than the collar diameter D5, however, the head diameter D3 and the collar diameter D5 may be identical. The neck diameter D4 is smaller than each of the head diameter D3 and the collar diameter D5. The neck diameter D4 is smaller than both the head diameter D3 and the collar diameter D5 so that the neck 128 can be retained within the lower opening 30 of the grommet 20 by the legs 42 during removal of the grommet 20.

Still referring to FIG. 10, an upper shaft 136 extends from the collar 48 toward wings 138 that extend outward from the shaft 136. The wings 138 are mirror images of one another, and therefore include similar or identical elements. The wings 138 define the second engagement ramps 96, as noted above. The wings 138 further define outer surfaces 140. In a preferred embodiment, a distance D6 between the outer surfaces 140 of the wings 138 is equal to or less than the diameter D1 of the upper opening 26 of the grommet 20. The second engagement ramps 96 are also preferably formed at an angle that is complementary to an angle of the first engagement ramps 94. However, as one of ordinary skill would appreciate, the angles of the varying surfaces described herein need not be exact to effectuate the removal of the grommet 20 via the grommet removal tool 84.

The wings 138 are also joined with a waist 144 of the tool 84, the waist 144 extending from the shaft 136 to a lateral stop 146. The lateral stop 146 is generally configured to prevent overextension of the tool 84 into the grommet 20 during removal thereof, and includes two lateral, planar segments that extend outward from the waist 144. As illustrated in FIGS. 14-18, the stop 146 is located at a distance from the head 120 of the tool 84 to prevent overextension into the grommet 20, but to also allow the head 120 of the grommet 20 to pass through the lower opening 30 of the grommet 20 during the removal process. In some embodiments, the tool 84 need not include the stop 146, or the stop 146 may be configured or disposed in a different orientation. A lower shaft 148 of the tool 84 extends from the stop 146 to a distal end 150 of the tool 84, and is generally in the shape of an elongate rounded square or rectangular extension bar. The lower shaft 148 may be configured to be inserted into a chuck of a tool, or otherwise inserted or coupled to a removal apparatus. In some embodiments, the lower shaft 148 of the tool 84 may be shaped to allow the lower shaft 148 to be inserted into a quick release style handle (not shown). The lower shaft 148 may have a number of configurations not specifically disclosed herein.

Referring to FIG. 11, a side elevational view of the tool 84 is shown. One of the wings 138 is shown more clearly, wherein the wing 138 is shown narrowing from one end to another. The narrowing profile of the wings 138 allows for some variance in the configuration of the tool before and while it is inserted into the grommet 20 for removal of the grommet 20. In a preferred embodiment, a portion of the wings 138 has a narrow profile, and the profile of the wings 138 generally widens out farther away from the head 120 of the tool 84. A portion of the wings 138 may define a generally triangular shape when viewed from the side. In some embodiments, the wings 138 may not include a narrowing portion, and instead, the wings 138 may comprise the same or substantially the same cross sectional width throughout. FIGS. 12 and 13 illustrate top and bottom views of the tool 84, and are provided for illustrative purposes.

Figure 14:
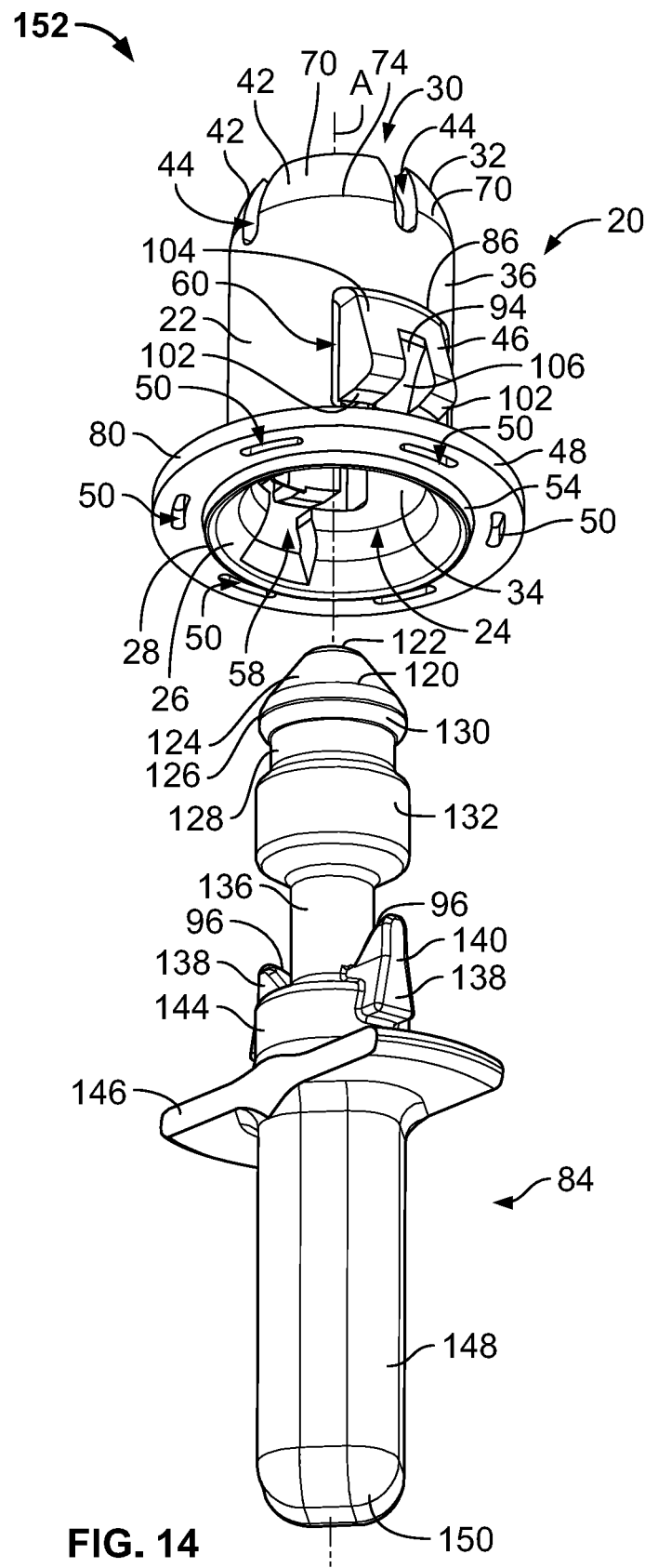
FIG. 14 is a perspective view of a grommet removal assembly that includes a grommet similar to the grommet of FIGS. 1-8 and a grommet removal tool similar to the grommet removal tool of FIGS. 9-13, in a first state before the tool is inserted into the grommet.

Now referring to FIGS. 14-18, a grommet removal assembly 152 is shown, which includes the grommet 20 of FIGS. 1-8 and the tool 84 of FIGS. 9-13. Before insertion of the head 120 of the tool 84 into the upper opening 26 of the grommet 20, the wings 138 are generally aligned with the ramps 94 of the arms 46, however, the narrowing feature of the wings 138 of the tool 84 may allow for variance with respect to how close to on-center the wings 138 must be to achieve aligned insertion into the grommet 20. Referring to FIG. 14, the grommet removal assembly 152 is shown in a first state, wherein the tool 84 has not yet been inserted into the grommet 20, and the grommet 20 is in the first or non-retracted state. The wings 138 of the tool 84 are shown generally aligned with the first engagement ramps 94 of the arms 46 of the grommet 20.

Figure 15:
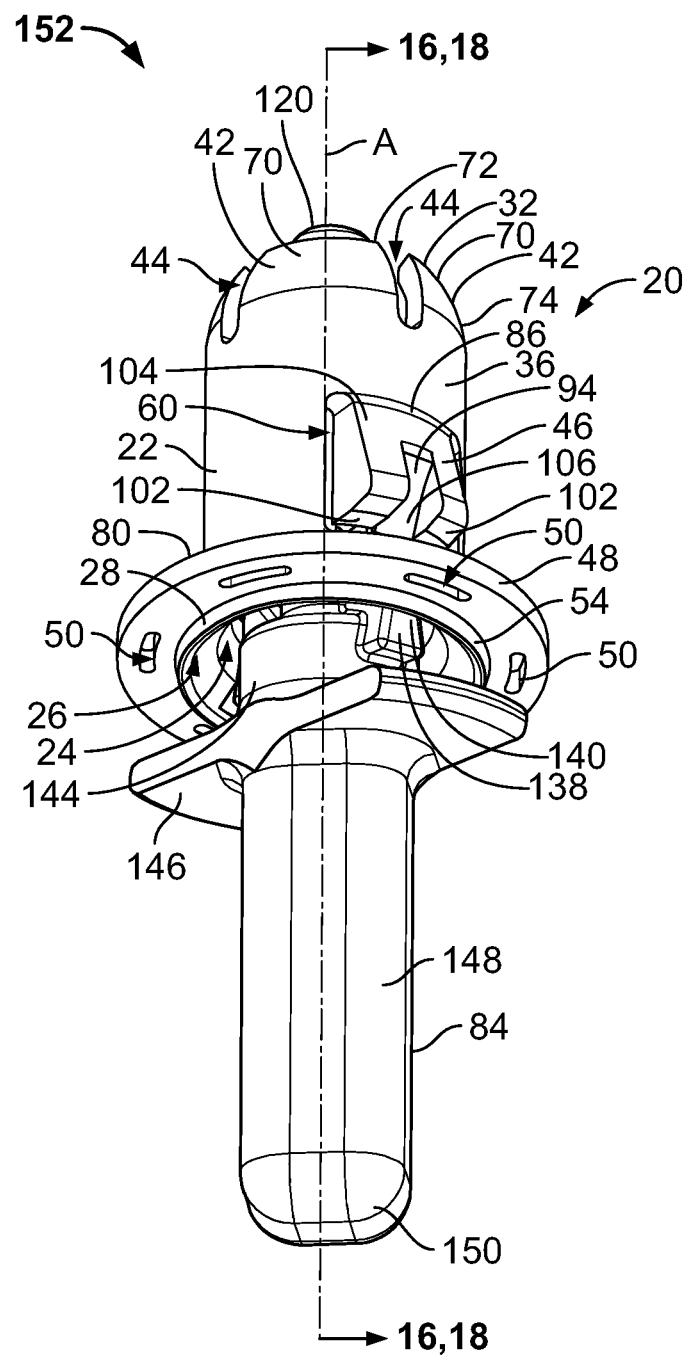
FIG. 15 is a perspective view of the grommet removal assembly of FIG. 14 in a second state, wherein the tool is partially inserted into the grommet.
Figure 16:
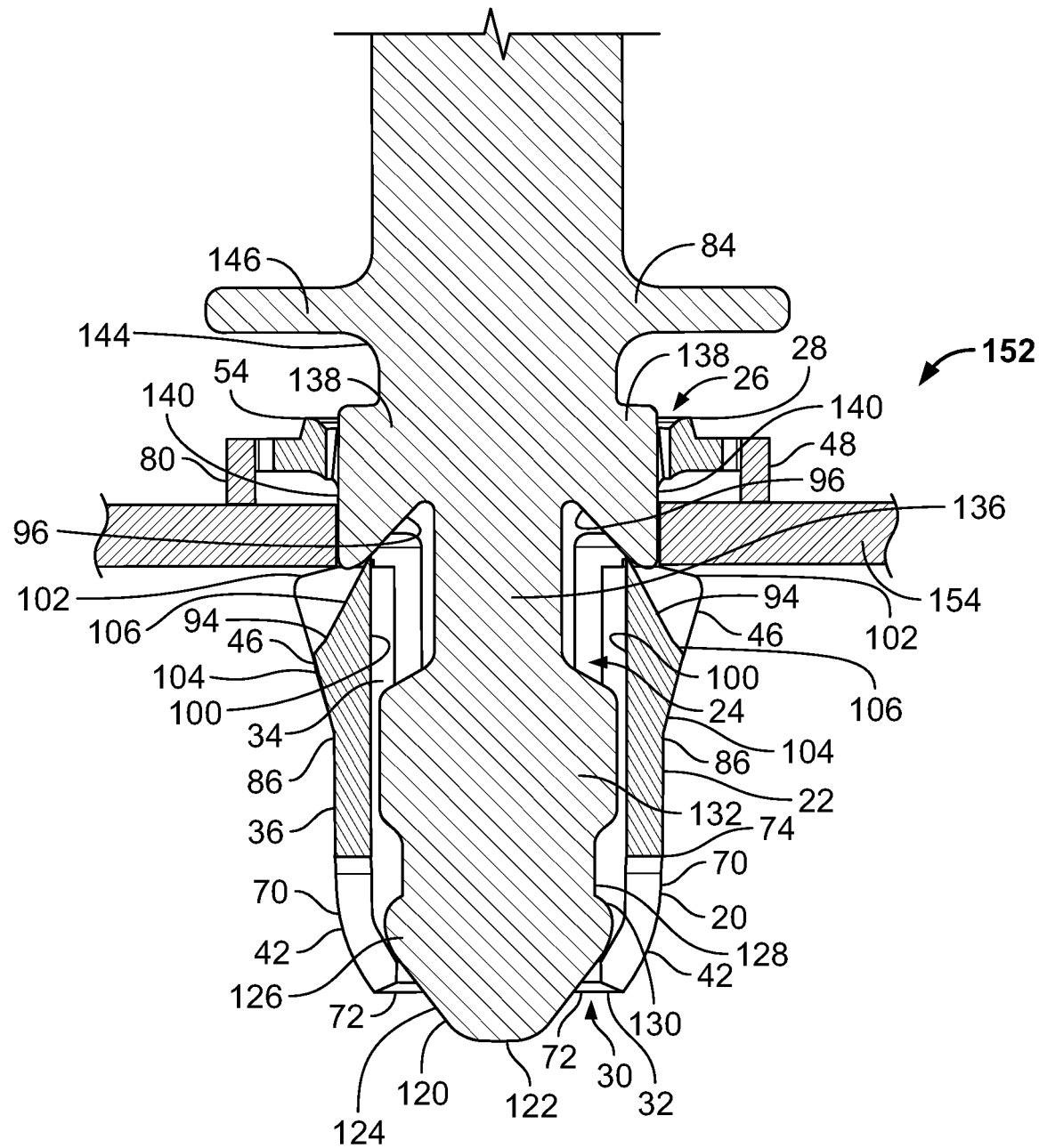
FIG. 16 is a side elevational, cross-sectional view of the grommet removal assembly of FIG. 15 in the second state.

Referring to FIGS. 15 and 16, the grommet removal assembly 152 is shown in perspective and elevational cross-sectional views, respectively. In these views, the grommet removal assembly 152 is shown in a second state, wherein the tool 84 is partially inserted into the grommet 20. The wings 138 of the tool 84 remain aligned with the ramps 94 of the grommet 20, and the head 120 of the tool 84 is shown partially extending out of the lower opening 30 of the grommet 20. The collar 132 of the tool 84 is shown within the grommet 20, the collar 132 defining a diameter that is generally the same as the diameter of the inner surface 34 of the wall 36 of the grommet 20. The respective dimensions of the tool 84 and the grommet 20 may allow or provide for snug communication between the two elements, which can allow for smooth, linear retraction of the grommet 20 once the grommet 20 and tool 84 are engaged, i.e., in the third state of FIGS. 17 and 18. For illustrative purposes, a material 154 is shown in cross-section in FIGS. 16 and 18, wherein the grommet 20 is shown fastened within an aperture of the material 154. The material 154 may be any material through which the grommet 20 may be inserted.

Figure 17:
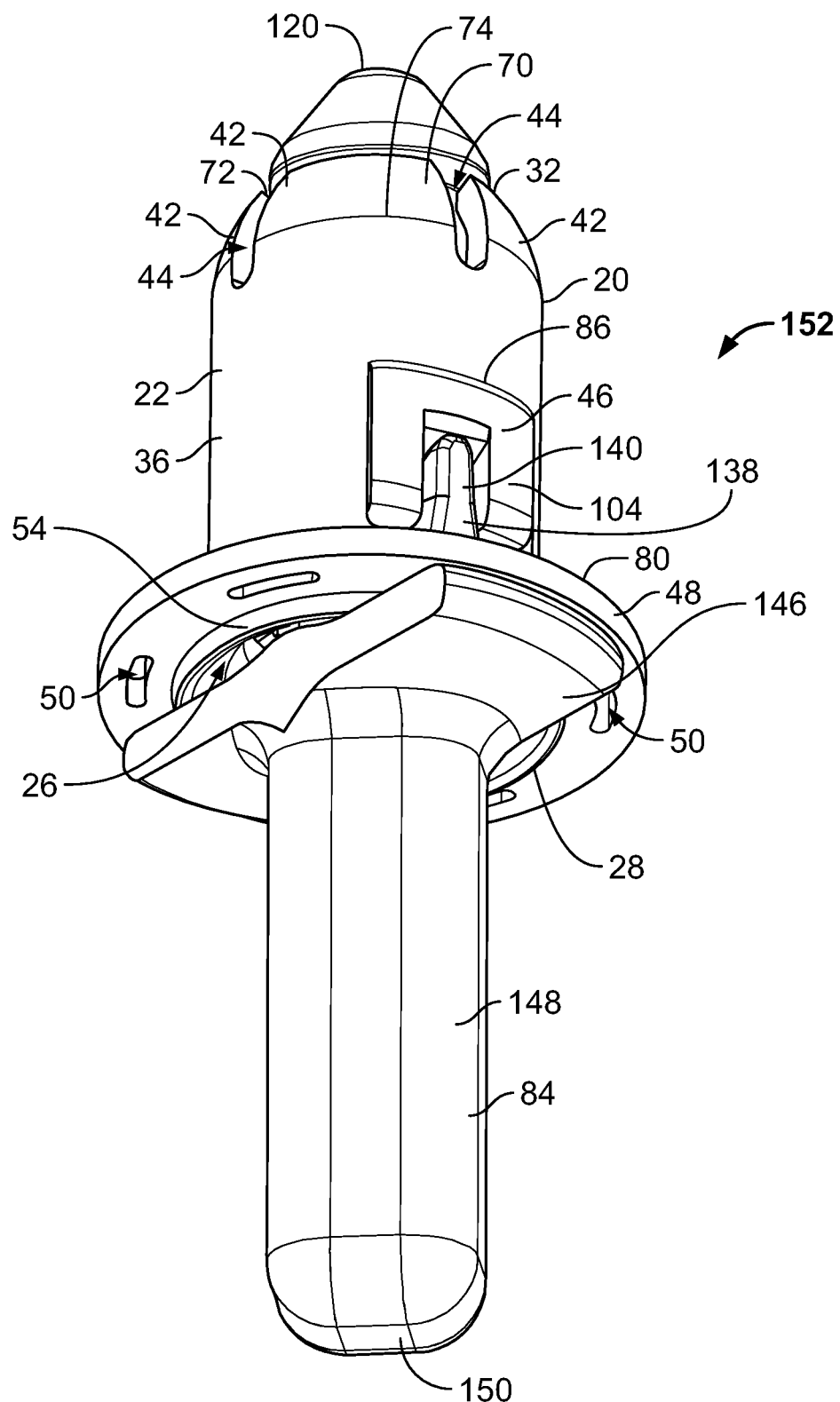
FIG. 17 is a perspective view of the grommet removal assembly of FIG. 14 in a third state, wherein the tool is fully inserted into the grommet.
Figure 18:
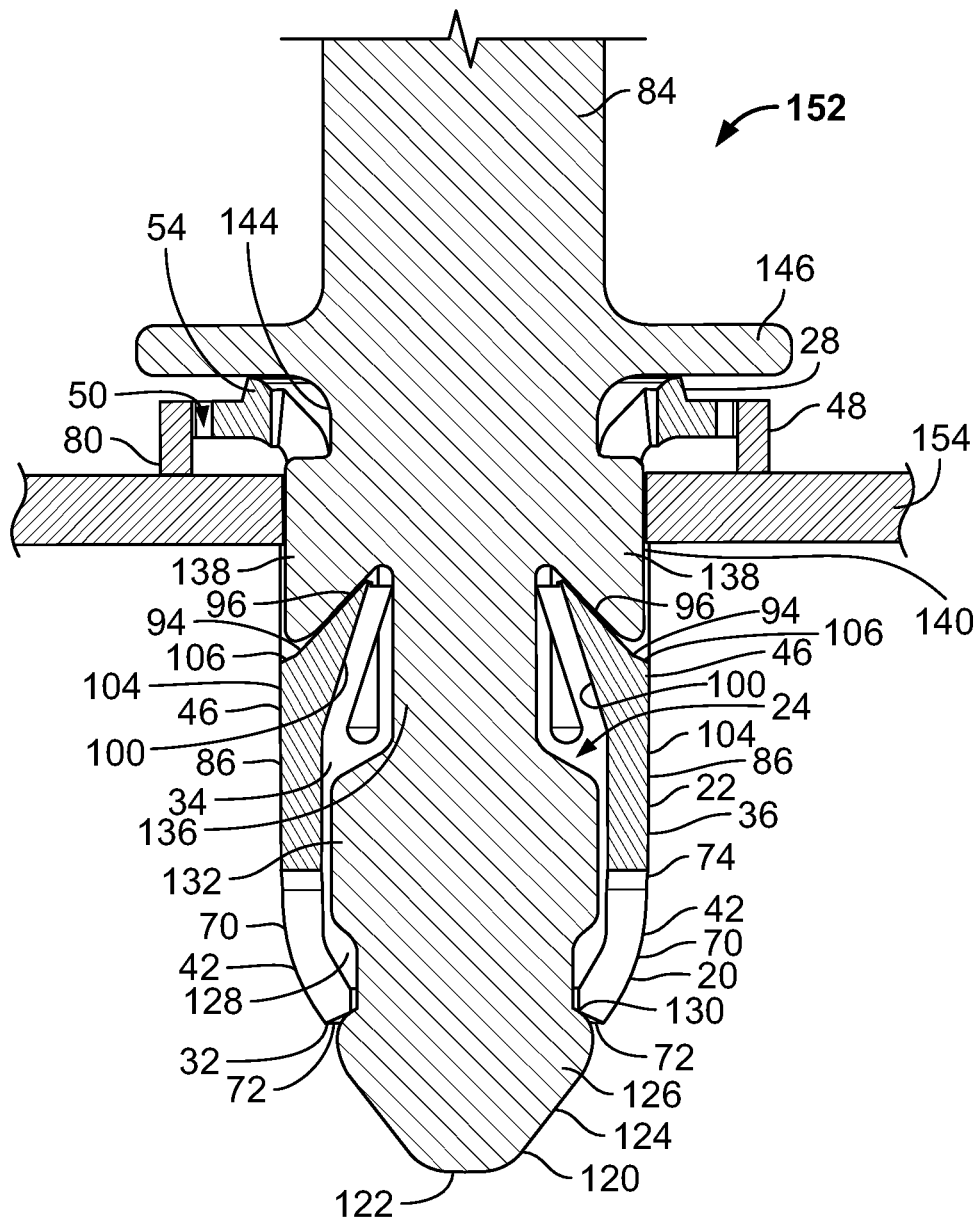
FIG. 18 is a side elevational, cross-sectional view of the grommet removal assembly of FIG. 17 in the third state.

Referring to FIGS. 17 and 18, the grommet removal assembly 152 is shown in a third, retracted state, wherein the tool 84 is shown fully inserted into the grommet 20, and the grommet 20 is capable of being removed from its disposition as presently coupled with the material 154. Referring specifically to FIG. 18, the head 120 of the tool 84 is inserted through the lower opening 30 of the grommet 20, and the neck 128 of the tool 84 is shown adjacent the tips 72 of the feet 42 of the grommet 20. To achieve the third state, the head 120 of the tool 84 is pushed through the lower opening 30, and the feet 42 of the grommet 20 flex outward, allowing the head 120 to pass through the lower opening 30. Once the head 120 has passed through the lower opening 30, the feet 42 flex back to a standard configuration, and retract around the neck 128 of the tool 84. The collar 132 is shown disposed within the body 22 of the grommet 20. The tool 84 remains in this configuration until the grommet 20 is removed from the material 154.

Still referring to FIG. 18, the ramps 94 of the grommet 20 are shown interlocked with the ramps 96 of the tool 84. When the tool 84 moves from the configuration shown in FIG. 16 to the configuration shown in FIG. 18, the ramps 96 of the tool 84 move linearly toward the lower end of the grommet 20, and engage with the ramps 94 of the grommet 20. When the ramps 96 of the tool 84 move toward the feet 42 of the grommet 20, the first and second engagement ramps 94, 96 engage with one another, and the ramps 96 of the tool 84 remain rigid while the ramps 94 along the arms 46 are movable via the arms 46 flexing at the joints 86. As a result of the linear motion of the tool 84, the interaction of the ramps 94, 96 draws the arms 46 of the grommet 20 inward, toward the longitudinal axis A, which results in the outer wall 36 of the arms 46 being flush with the outer wall 36 of the body 22 of the grommet 20. In such a configuration, the grommet 20 is easily removable since no element juts outward from the body 22, which would otherwise prevent removal of the grommet 20. Further, due to the configuration of the head 120 of the tool 84 having been pushed through the lower opening 30 of the grommet 20, and because the head diameter D3 is greater than the diameter D2 of the lower opening 30, the tool 84 is in a configuration wherein reverse linear motion can draw the grommet 20 out of its retained configuration.

While the grommet removal assembly 152 described herein refers to the use of ramp structures to draw the arms 46 of the grommet 20 inward, alternative means of drawing the arms inward are contemplated. For example, the tool 84 may include a threaded structure along a surface thereof, which may interlock with threading along the inner side 34 of the grommet 20. Such a threaded assembly would allow the arms 46 of the grommet 20 to be drawn inward when the threaded portion is inserted into the grommet 20.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

I claim:

1. A grommet, comprising:
   a body defining a longitudinal axis and having a wall, the wall defining an inner surface;
   a collar extending from the body and away from the longitudinal axis;
   a plurality of legs extending from the body;
   a plurality of arms extending from the body at a flexure joint, each of the plurality of arms including an inner surface that is flush with the inner surface of the wall in a first state, an angled surface, and a first engagement ramp that interrupts the angled surface; and
   a plurality of windows that are disposed between the plurality of arms and the collar, the plurality of windows defining a central portion and a top portion, the central portion being wider than the top portion,
   wherein the plurality of arms are movable between the first state and a second state at the flexure joint.

2. The grommet of claim 1, wherein the angled surfaces of the plurality of arms are flush with an outer surface of the wall in the second state.

3. The grommet of claim 1,
   wherein the first engagement ramp of each of the plurality of arms is configured to receive a second engagement ramp along a grommet removal tool.

4. The grommet of claim 1, wherein the plurality of arms is surrounded by at least one opening between each of the plurality of arms and the body.

5. The grommet of claim 1, wherein longitudinal slots separate the plurality of legs that extend from the body.

6. The grommet of claim 5, wherein the plurality of legs comprise inwardly canted tips that are angled toward the longitudinal axis.

7. The grommet of claim 1, wherein the plurality of arms are surrounded by windows, and
   wherein first and second segments of the windows are disposed along first and second sides of the plurality of arms.

8. The grommet of claim 1, wherein the plurality of arms includes only two arms, which are disposed on opposite sides of the grommet.

9. A grommet tool, comprising:
   a head defining a head surface, a base, and a tip;
   a neck extending from the base of the head at a shoulder;
   a collar that joins the neck with a shaft, the shaft extending longitudinally between the collar and a waist;
   a plurality of wings extending from the shaft such that the shaft extends from the collar and toward the plurality of wings, the plurality of wings defining first engagement ramps, the first engagement ramps of the plurality of wings are configured to engage with second engagement ramps along arms of a grommet; and
   a lateral stop disposed between the waist and a distal end of the grommet tool that is opposite the tip, wherein a diameter of the lateral stop is greater than a diameter of the waist, and a diameter of the waist is greater than a diameter of the shaft,
   wherein a diameter of the base of the head is greater than a diameter of the neck, and a diameter of the collar is greater than a diameter of the neck,
   wherein the diameter of the neck is greater than a diameter of the shaft.

10. The grommet tool of claim 9, wherein the plurality of wings comprises only two wings, and wherein the two wings are mirror images of one another.

11. A grommet removal assembly, comprising:
a grommet that includes:
- a body defining a longitudinal axis;
- a plurality of arms extending from the body, the plurality of arms defining angled surfaces that are interrupted by first engagement ramps; and
- a plurality of legs extending from the body, and a grommet removal tool that includes:
- a shaft configured to extend along the longitudinal axis within the body of the grommet; and
- a plurality of wings extending from the shaft and defining a plurality of second engagement ramps, wherein an open space exists between the plurality of second engagement ramps and the shaft, and wherein the second engagement ramps of the wings are configured to engage with the first engagement ramps along the plurality of arms to draw the plurality of arms inward, toward the longitudinal axis of the body.

12. The grommet removal assembly of claim 11, wherein an inner surface of the plurality of arms is flush with an inner surface of the body in a first state, and
wherein the inner surface of the plurality of arms is not flush with the inner surface of the body in a second state.

13. The grommet removal assembly of claim 11, wherein the grommet removal tool further includes a head, and
wherein the head of the grommet removal tool is inserted through an opening defined by the plurality of legs when the second engagement ramps of the wings engage with the first engagement ramps along the plurality of arms.

14. The grommet removal assembly of claim 13, wherein tips of the plurality of legs are inwardly canted toward the longitudinal axis.

15. The grommet removal assembly of claim 11, wherein windows surround lateral sides of the plurality of arms that extend from the body.

16. The grommet removal assembly of claim 11,
wherein the angled surfaces are angled with respect to the first engagement ramps.

17. The grommet removal assembly of claim 16, wherein the angled surfaces are flush with an outer surface of the body when the plurality of arms have been drawn in by the second engagement ramps of the wings.

18. The grommet removal assembly of claim 16, wherein inner surfaces of the plurality of arms are flush with an inner surface of the body before the plurality of arms are drawn in by the second engagement ramps of the wings.

* * * * *